Oct. 19, 1965 G. DIRKS 3,213,437

STORAGE AND TRANSMISSION OF DATA SIGNALS

Original Filed Nov. 28, 1958

INVENTOR
GERHARD DIRKS
BY Joseph Weingarten
ATTORNEY

United States Patent Office 3,213,437

Patented Oct. 19, 1965

3,213,437

STORAGE AND TRANSMISSION OF DATA SIGNALS

Gerhard Dirks, 44 Moerfelder Landstrasse, Frankfurt am Main, Germany

Continuation of application Ser. No. 777,119, Nov. 28, 1958. This application July 10, 1961, Ser. No. 126,771
Claims priority, application Great Britain, Dec. 9, 1957, 38,416/57
24 Claims. (Cl. 340—174.1)

Figure 1:
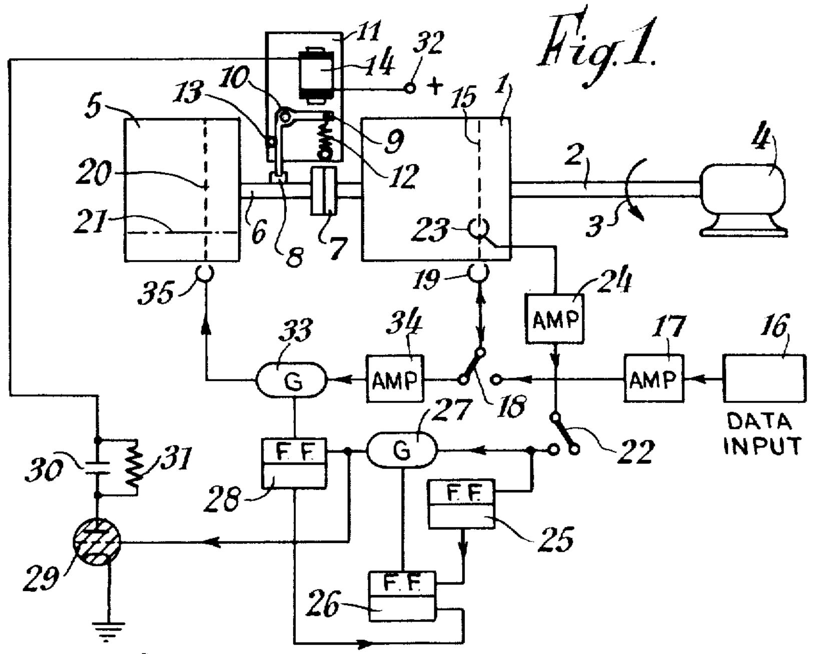

This application is a continuation-application of pending patent application Serial No. 777,119, filed November 28, 1958, and entitled "Storage and Transmission of Data Signals," now abandoned.

This invention relates to cyclically operable magnetic data storage apparatus.

Magnetic drums and discs are well known for use as data storage devices. They are usually provided with one or more timing signal tracks which are used to control address counters. These counters control the selection of data items from the data tracks on the drum. The address of each data item is thus specified by the position of the area in which it is recorded relative to the fixed timing signals. Normally a single pulse is recorded in one timing track to act as an end of revolution marker pulse, which provides the reference by which the data storage positions may be identified.

It has been the practice to provide a buffer store, such as a shifting register, to allow data items arriving at random times to be recorded in the required position on the drum or disc. The data is held in the buffer store until the required area is available to the recording head.

It is an object of the invention to simplify the recording of data on a cyclic magnetic store in a fixed position relative to a reference point of the store.

It is another object of the invention to control the rotation of a cyclic magnetic storage device to allow recording of a data item to start at a predetermined point in a recording track.

In accordance with one embodiment of the invention, the cyclically operable data storage apparatus includes a rotatable storage member bearing a magnetic signal recording track, a recording head cooperating with the track, a source of signal trains to be recorded, means to apply a signal train to the recording head, latching means settable to an effective position in which the storage member is held in a predetermined position and to an ineffective position in which the storage member is allowed to rotate and means responsive to said signals from the signal source to set the latching means to the ineffective position to cause recording of the signal train to start at a predetermined point in the recording track.

The invention may also be embodied in a cyclically operable data storage apparatus which includes a rotatable storage member with a magnetic signal recording track thereon, a recording head cooperating with the recording track, a record member bearing a group of data representing signals, signal sensing means past which the record member is moved, means for applying signals from the sensing means to the recording head, latching means settable to an effective position in which the storage member is held in a predetermined position and to an ineffective position in which the storage member is allowed to rotate, and means responsive to signals from the sensing means to set the latching means to the ineffective position to cause recording of the sensed signals to start at a predetermined point in the recording track.

Figure 2:
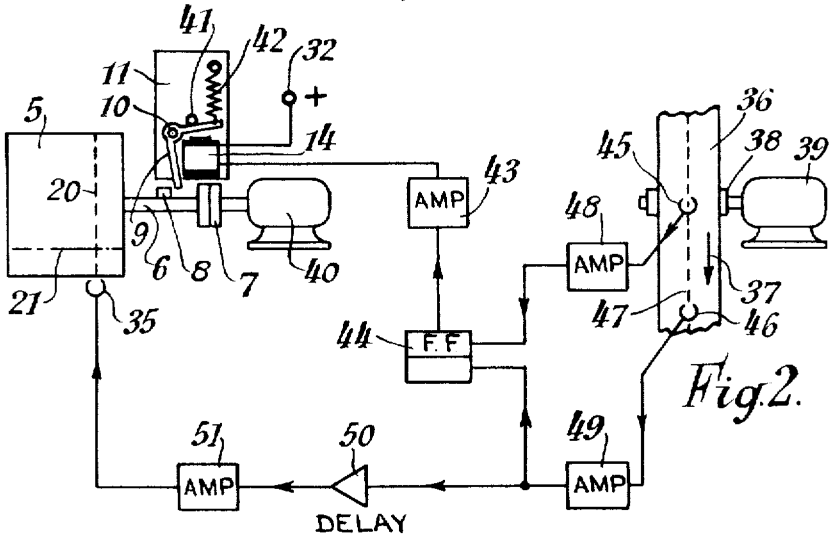

The invention will now be described, by way of example, with reference to the accompanying drawing, in which:

FIG. 1 is a schematic diagram of an arrangement for recording signals on a magnetic drum under control of signals sensed from another magnetic drum; and FIG. 2 is a schematic diagram of a modified arrangement in which the signals to be recorded are sensed from a magnetic tape.

Referring now to FIG. 1, magnetic storage drum 1 is shown mounted on a shaft 2, which is rotated continuously in the direction of arrow 3 by a motor 4. A second magnetic storage drum 5 is mounted on a shaft 6, which is coupled to the shaft 2 through a friction clutch 7. The clutch may be of any conventional type which will drive the shaft 6 under light loading conditions and which will slip when the shaft 6 is restrained. For example it may consist of a disc secured to the shaft 2 and a similar disc splined on the shaft 6 and lightly sprung towards the first disc, the opposing faces of the two discs being covered with a suitable frictional material.

The shaft 6 carries a projection 8 which is normally engaged by one arm of an L-shaped latch 9. The latch is pivotally attached at 10 to a support 11. A spring 12 acts on the other arm of the latch 9 to hold it in engagement with the projection 8. The movement of the latch is limited by a stop 13. An electromagnet 14 is mounted on the support 11 adjacent to an arm of the latch. On energization, the electromagnet attracts the latch arm, which rotates in a counter-clockwise direction and is thereby disengaged from the projection 8.

Normally the electromagnet 14 is not energized and the latch 9 engages the projection 8. The clutch 7 slips and holds the projection against the latch, so that the drum 5 is held stationary in a known position. When the electromagnet is energized the latch is shifted out of engagement and the drum is released for rotation.

The drum 1 has a data signal recording track 15. Signals from a data input source 16 may be recorded in the track 15 by shifting a switch 18. This allows signals to be fed from the input 16 through amplifier 17 and switch 18, to a recording head 19 which is associated with the track 15.

The signals from the input 16 preferably occur in groups, each group forming a data word. The length of the track 15 is sufficient to store more than one word, preferably, at least two words. The data input is not synchronized with the drum 1 and the data signals are recorded as they occur. Hence, a word may be recorded at any position in the track 15. A word randomly recorded in the track 15 in this manner is to be recorded in a track 20 on the drum 5, with the recording starting in a predetermined position in the track which is indicated by a chain-dotted line 21.

In order to record a word in the track 20, the switch 18 is set to the position shown in FIG. 1 and switch 22 is closed. A magnetic head 23 senses any signals recorded in the track 15 of the drum 1. The head 23 drives a reading amplifier 24, the output of which is fed through the then closed switch 22 to the input of a conventional two tube mono-stable flip-flop 25. The first signal fed to the flip-flop 25 by the amplifier 24 switches the flip-flop on. The time constant of the flip-flop is such that it switches off after a time slightly greater than that required to sense a word from the track 15. One anode of the flip-flop 25 is capacitatively coupled to the input of a conventional two tube bi-stable flip-flop 26, so that the flip-flop 25 in switching off applies a pulse which switches on the flip-flop 26.

The output of the amplifier 24 is also fed to one grid of a conventional pentode gate 27. The potential of the other grid of the gate is controlled by the flip-flop 26. The gate is closed or open in accordance with whether the flip-flop 26 is off or on. Thus the gate 27 does not pass the signals from the amplifier 24 which cause switching of the flip-flop 2. However, the word recorded in the track 15 will be sensed again during the next revolution of the drum 1. The flip-flop 26 is then on and the signals are passed by the gate 27 to the input of a second mono-stable flip-flop 28 and to the control grid of a gas-filled tube 29. The first signal passed by the gate 27 switches on the flip-flop 28 and fires the tube 29. The anode of the tube 29 is connected through a parallel capacitor and resistor combination 30, 31 and the winding of the electromagnet 14 to a positive supply terminal 32. The anode of the tube 29 is normally at the positive supply voltage. When the tube is fired the anode current consists of the charging current of the caacitor 30, together with the current flowing through the resistor 31. This resistor cannot pass sufficient current to maintain the tube conducting. Hence, as the charging current falls a point is reached at which the tube extinguishes. The capacitor 30 then discharges through the resistor 31.

The pulse of anode current passed by the tube 29 energizes the electromagnet 14 to withdraw the latch 9 from engagement with the projection 8. This releases the shaft 6, carrying the drum 5, and allows it to be driven through the clutch 7. The latch is returned by the spring 12 when the electromagnet is de-energized and re-engages the projection 8 after one revolution of the shaft 6.

The flip-flop 28 controls a gate 3, the gate being open when the flip-flop is on. In this condition the signals from the head 19 are fed through the switch 18, an amplifier 34, and the gate 3 to a recording head 35 which records in the track 20. The head 23 is positioned in advance of the head 19, so that the drum is released for rotation under control of the signals sensed by the head 23 and has time to accelerate to approximately the speed of the drum 1 before the same signals are sensed by the head 19. The spacing between the heads 19 and 23 is such that the part of the track 20 indicated by the line 21 is passing the head 35 at the time when the first signal in the track 15 is sensed by the head 19. Since the rotation of the drum 5 is initiated by pre-sensing of the start of a word in the track 15, recording of the word in the track 20 will always commence at the part of the track indicated by 21.

The time constant of the mono-stable flip-flop 28 is such that it switches off just after the word in track 15 has been completely sensed by the head 19. The flip-flop 28 is capacitatively coupled to an input of the flip-flop 26. The switching off of the flip-flop 28 applies a pulse to the flip-flop 26 to switch it off, thus returning the circuit to the initial condition.

It will be appreciated that the latch and clutch may take different forms, provided that the shaft 6 is held in a predetermined position and that the shaft may be released in response to an electrical signal. For example, the separate clutch and latch may be replaced by an electromagnetically controlled one revolution clutch. Such clutches are well known in relation to record card controlled machines, for controlling the feeding of cards from a stack, for example.

The drum may normally be freely driven through the clutch 7 and be arrested only just before a recording is to be made. This modification is shown in FIG. 2 in an arrangement for recording data derived from a magnetic tape 36, instead of from the drum 1. The magnetic tape 36 is fed in the direction of arrow 37 by the usual feeding mechanism represented schematically by a roller 38 and a motor 39. It is convenient in this case to use a separate motor 40 for driving the drum 5 through the clutch 7.

The latch 9 is normally held against a stop 41 by a spring 42, so that the latch is clear of the projection 8. Thus the drum is normally rotated by the motor 40. The electromagnet 14 is positioned so that it brings the latch into the path of the projection 8, when the electromagnet is energized. The electromagnet is energized by a power amplifier 43 which is D.C. coupled to a bi-stable flip-flop 44. The amplifier is non-conducting when the flip-flop 44 is off and conducts heavily to energize the electromagnet 14 as long as the flip-flop is on.

The state of the flip-flop 44 is controlled by signals from magnetic heads 45 and 46, which sense a track 47 on the tape 36. The heads 45 and 46 are spaced apart by a distance such that rather more than one revolution of the drum occurs between the sensing of a signal by the head 45 and the sensing of the same signal by the head 46.

Signals sensed by the head 45 are fed through an amplifier 48 to one input of the flip-flop 44. The flip-flop 44 is normally off and is switched on by the first signal of a word sensed by the head 45. This makes the amplifier 43 conduct and energizes the electromagnet 14, which moves the latch 9 into the path of the projection 8. At some time during the next revolution of the drum 5, the projection will engage the latch and the drum will be brought to rest and held until the flip-flop 44 is switched off.

After rather more than the time for one drum revolution, the signal which was sensed by the head 45 to switch on the flip-flop 44 will be sensed by the head 46. This head is connected to the input of an amplifier 49, the output of which is connected to the input of a conventional lumped constant delay line circuit 50 and to the other input of the flip-flop 44. This first signal of the word switches off the flip-flop 44, thus de-energizing the electromagnet 14 and allowing the spring 42 to pull the latch 9 clear of the projection 8. The drum 5 is now free to rotate. The delay imposed by the delay circuit 50 on the signals from the amplifier 49 is such that the first signal of the word is fed through an amplifier 51 to the head 35 at the time when the part of the track indicated by 21 is passing the head. Thus recording of the word will start at the required predetermined point in the track 20.

It has been explained that it is necessary to have a delay between the sensing of the signals for controlling the release of the drum 5 and the recording of the same signals on the drum 5. In the arrangement of FIG. 1 this is provided by the spacing apart of the heads 23 and 19, and in FIG. 2 by the delay circuit 50.

The recording always starts at the pre-determined point of the track 20. Consequently, a second word or block of data will be recorded over previously recorded data. In order to preserve the data, the drum may have a number of tracks similar to the track 20, each track having an associated recording head, these heads being connected in turn to the gate 33 (FIG. 1) or the amplifier 51 (FIG. 2) by a conventional head switching arrangement. Alternatively, a reading head (not shown) may be provided for the track 20 so that the data may be read out before it is erased by overwriting of further data.

A limited amount of data is recorded in the track 20 during any one recording operation, so that a short length of track suffices. Therefore, the drum 5 may be of relatively small diameter with a relatively low inertia.

It will be appreciated that the track 20 may equally well be on a disc as on a drum. The signals to be recorded in the track 20 may be derived from the sensing of record cards or paper tape, instead of from a drum or magnetic tape as described above.

What I claim is:

1. In a data storage arrangement, in combination, a first continuously moving recording medium having data signals recorded thereon; a second recording medium adapted to be rotated; rotating means for rotating said second recording medium; circuit means interconnecting said first and second recording medium; a presensing head in operative proximity with said first recording medium for energizing through said circuit means said rotating means to rotate said second recording medium under the control of a presensed one of said data signals; and a sensing head spaced behind said presensing head in operative proximity with said first recording medium for supplying said data signals from said first recording medium to said second recording medium through said circuit means a predetermined period of time after said rotating means is energized.

2. In a data storage arrangement, in combination, a first continuously moving recording medium having data signals recorded thereon; a second recording medium adapted to be rotated; rotating means for rotating said second recording medium, said rotating means including electromagnetic means for controlling the rotating of said second recording medium, said electromagnetic means being adapted to be controlled by a data signal; circuit means interconnecting said first and second recording mediums; a presensing head in operative proximity with said first recording medium for energizing through said circuit means the electromagnetic means of said rotating means to rotate said second recording medium under the control of a presensed one of said data signals, said presensing head being connected to said circuit means; and a sensing head spaced behind said presensing head in operative proximity with said first recording medium for supplying said data signals from said first recording medium to said second recording medium through said circuit means a predetermined period of time after the electromagnetic means of said rotating means is energized.

3. In a data storage arrangement, in combination, a first continuously moving recording medium having data signals recorded thereon; a second recording medium; circuit means interconnecting said first and second recording mediums; presensing means in operative proximity with said first recording medium for providing a signal path through said circuit means between said first and second recording mediums under the control of a presensed one of said data signals; and sensing means spaced behind said presensing means in operative proximity with said first recording medium for supplying said data signal from said first recording medium to said second recording medium through said signal path a predetermined period of time after said signal path is provided by said presensed data signal.

4. In a data storage arrangement, in combination, a first continuously moving recording medium having data signals recorded thereon; a second recording medium adapted to be rotated; rotating means for rotating said second recording medium; circuit means interconnecting said first and second recording mediums; a presensing head in operative proximity with said first recording medium for providing a signal path through said circuit means between said first and second recording mediums and for energizing said rotating means to rotate said second recording medium under the control of a presensed one of said data signals; and a sensing head spaced behind said presensing head in operative proximity with said first recording medium for supplying said data signals from said first recording medium to said second recording medium through said signal path a predetermined period of time after said signal path is provided by said presensed data signal.

5. In a data storage arrangement, in combination, a first continuously moving recording medium having data signals recorded thereon; a second recording medium adapted to be rotated; rotating means for rotating said second recording medium, said rotating means including electromagnetic means for controlling the rotating of said second recording medium, said electromagnetic means being adapted to be controlled by a data signal; circuit means interconnecting said first and second recording mediums; a presensing head in operative proximity with said first recording medium for providing a signal path through said circuit means between said first and second recording mediums and for energizing the electromagnetic means of said rotating means to rotate said second recording medium under the control of a presensed one of said data signals, said presensing head being connected to said circuit means and to said electromagnetic means; and a sensing head spaced behind said presensing head in operative proximity with said first recording medium for supplying said data signals from said first recording medium to said second recording medium through said signal path a predetermined period of time after said signal path is provided by said presensed data signal and after the electromagnetic means of said rotating means is energized.

6. A data storage arrangement comprising, in combination, first continuously moving storage means having data signals recorded thereon, said data signals forming a data unit commencing with a first data signal and ending with a last data signal; second storage means comprising a rotatable recording medium; rotating means for rotating said rotatable recording medium; transfer means connected between said first and second storage means for transferring said data signals from said first storage means to said second storage means; transfer control means connected to said transfer means; presensing means in operative proximity with said first storage means for sensing said data signals, for energizing said transfer control means with said first data signal to open said transfer means to permit the transfer of data signals therethrough, and for energizing said rotating means to initiate rotation of said rotatable recording medium; and sensing means spaced behind said presensing means in operative proximity with said first storage means for sensing said data signals a predetermined period of time after said data signals are sensed by said presensing means and for supplying said data signals from said first storage means to said second storage means through said transfer means.

7. A data storage arrangement comprising, in combination, first storage means comprising a continuously rotating recording medium, said rotating recording medium having data signals recorded thereon, said data signals forming a data unit commencing with a first data signal and ending with a last data signal; second storage means comprising a rotatable recording medium; rotating means for rotating said rotatable recording medium; transfer means connected between said first and second storage means for transferring said data signals from said first storage means to said second storage means; transfer control means connected to said transfer means; presensing means in operative proximity with said first storage means for sensing said data signals for energizing said transfer control means with said first data signal to open said transfer means to permit the transfer of data signals therethrough, and for energizing said rotating means to initiate rotation of said rotatable recording medium; and sensing means spaced behind said presensing means in operative proximity with said first storage means for sensing said data signals a predetermined period of time after said data signals are sensed by said presensing means and for supplying said data signals from said first storage means to said second storage means through said transfer means, said predetermined period of time being of a duration sufficient to enable the speed of rotation of said second storage means to reach the speed of rotation of said first storage means.

8. A data storage arrangement comprising, in combination, first storage means comprising a continuously rotating recording meduim, said rotating recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said first storage means to said second storage means; transfer control means connected to said transfer means; presensing means in operative proximity with said first storage means for sensing said data signals, for energizing said transfer control means with said first data signal to open said transfer means to permit the transfer of data signals therethrough, and for energizing said rotating means to initiate rotation of said rotatable recording medium; and sensing means spaced behind said presensing means in operative proximity with said first storage means for sensing said data signals a predetermined period of time after said data signals are sensed by said presensing means and for supplying said data signals from said first storage means to said second storage means through said transfer means, said predetermined period of time being of a duration selected so that said first data signal transferred through said transfer means reaches said rotatable recording medium at the fixed starting place thereon.

9. A data storage arrangement comprising, in combination, first storage means comprising a continuously rotating recording medium, said rotating recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said first storage means to said second storage means; transfer control means connected to said transfer means; presensing means in operative proximity with said first storage means for sensing said data signals, for energizing said transfer control means with said first data signal to open said transfer means to permit the transfer of data signals therethrough, and for energizing said rotating means to initiate rotation of said rotatable recording medium; and sensing means spaced behind said presensing means in operative proximity with said first storage means for sensing said data signals a predetermined period of time after said data signals are sensed by said presensing means and for supplying said data signals from said first storage means to said second storage means through said transfer means, said predetermined period of time being of a duration selected so that said first data signal transferred through said transfer means reaches said rotatable recording medium at the fixed starting place thereon and sufficient to enable the speed of rotation of said second storage means to reach the speed of rotation of said first storage means.

10. A data storage arrangement comprising, in combination, first storage means comprising a continuously rotating recording medium, said rotating recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said rotating recording medium to said rotatable recording medium; transfer control means connected to said transfer means; a presensing head positioned in operative proximity with said rotating recording medium for sensing said data signals, for energizing said transfer control means to permit the transfer of data signals therethrough, and for energizing said rotating means to initiate rotation of said rotatable recording medium, said presensing head being coupled to said transfer control means and to said rotating means; a sensing head spaced behind said presensing head in operative proximity with said rotating recording medium for sensing said data signals a predetermined period of time after said data signals are sensed by said presensing head and for supplying said data signals from said rotating recording medium to said rotatable recording medium through said transfer means, said sensing head being coupled to said transfer means; and a recording head positioned in operative proximity with said rotatable recording medium, said recording head being coupled to said transfer means.

11. A data storage arrangement comprising, in combination, a first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced between said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; transfer means connected between said sensing head and said recording head for transferring said data signals fom said rotating recording medium to said rotatable recording medium; transfer control means connected between said presensing head and said transfer means for controlling the transfer of data signals through said transfer means; and coupling means coupling said presensing head to said rotating means so that said presensing head controls the operation of said rotating means to initiate rotation of said rotatable recording medium.

12. A data storage arrangement comprising, in combination, first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced behind said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; transfer means connected between said sensing head and said recording head for transferring said data signals from said rotating recording medium to said rotatable recording medium, said transfer means comprising an electronic device having an input connected to said sensing head, an output connected to said recording head and conduction control means; transfer control means connected between said presensing head and said transfer means for controlling the transfer of data signals through said transfer means, said transfer control means comprising electronic circuit means having an input connected to said presensing head and an output connected to the conduction control means of said electronic device; and coupling means coupling said presensing head to said rotating means so that said presensing head controls the operation of said rotating means to initiate rotation of said rotatable recording medium.

13. A data storage arrangement comprising, in combination, first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced behind said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; transfer means connected between said sensing head and said recording head for transferring said data signals from said rotating recording medium to said rotatable recording medium, said transfer means comprising an electronic gate having an input connected to said sensing head, an output connected to said recording head and conduction control means, said gate being adapted to maintain under the control of its conduction control means one of an open condition in which a substantially low impedance sufficient to conduct said data signals is presented between the input of said gate and the output thereof and a closed condition in which a substantially high impedance sufficient to block said data signals is presented between the input of said gate and the output thereof; transfer control means connected between said presensing head and said transfer means for controlling the transfer of data signals through said transfer means, said transfer control means comprising electronic circuit means having an input connected to said presensing head and an output connected to the conduction control means of said electronic device; and coupling means coupling said presensing head to said rotating means so that said presensing head controls the operation of said rotating means to initiate rotation of said rotatable recording medium.

14. A data storage arrangement comprising, in combination, first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced between said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; transfer means connected between said sensing head and said recording head for transferring said data signals from said rotating recording medium to said rotatable recording medium, said transfer means comprising an electronic gate having an input connected to said sensing head, an output connected to said recording head and conduction control means, said gate being adapted to maintain under the control of its conduction control means one of an open condition in which a substantially low impedance sufficient to conduct said data signals is presented between the input of said gate and the output thereof and a closed condition in which a substantially high impedance sufficient to block said data signals is presented between the input of said gate and the output thereof; transfer control means connected between said presensing head and said transfer means for controlling the transfer of data signals through said transfer means, said transfer control means comprising multivibrator circuit means and gate means connected in circuit between said presensing head and the conduction control means of said electronic gate; and coupling means coupling said presensing head to said rotating means so that said presensing head controls the operation of said rotating means to initiate rotation of said rotatable recording medium, said coupling means including the gate means of said circuit and a coupling connection between said gate means and said rotating means, said predetermined period of time being of a duration selected so that said first data signal transferred through said transfer means reaches said rotatable recording medium at the fixed starting place thereon and sufficient to enable the speed of rotation of said second storage means to reach the speed of rotation of said first storage means.

15. A data storage arrangement comprising, in combination, first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced behind said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; coupling means coupling said presensing head to said rotating means so that said presensing head controls the operation of said rotating means to initiate rotation of said rotatable recording medium; transfer means connected between said sensing head and said recording head for transferring said data signals from said rotating recording medium to said rotatable recording medium, said transfer means comprising a first gate having an input connected to said sensing head, an output connected to said recording head and conduction control means, said first gate being adapted to maintain under the control of its conduction control means one of an open condition in which it conducts said data signals between its input and output and a closed condition in which it blocks said data signals; and transfer control means connected between said presensing head and the conduction control means of said first gate for controlling the transfer of data signals through said transfer means, said transfer control means comprising a first monostable multivibrator having a first output connected to the conduction control means of said first gate, a second output and an input, a second gate having an input connected to said presensing head, an output connected to the input of said first monostable multivibrator and conduction control means, said second gate being adapted to maintain under the control of its conduction control means one of an open condition in which it conducts said data signals between its input and output and a closed condition in which it blocks said data signals, and multivibrator circuit means connected between said presensing head and the conduction control means of said second gate for controlling in accordance with a predetermined time sequence the condition of said second gate and thereby controlling the condition of said first gate through said monostable multivibrator, and said coupling means including said second gate and a coupling connection between the output of said second gate and said rotating means so that said multivibrator circuit means also controls the operation of said rotating means through said second gate.

16. A data storage arrangement, comprising, in combination, first storage means comprising a continuously rotating recording medium, said rotating recording medium having data signals recorded thereon, said data signals forming a data unit commencing with a first data signal and ending with a last data signal; a presensing head positioned in operative proximity with said rotating recording medium for sensing said data signals; a sensing head spaced behind said presensing head positioned in operative proximity with said rotating recording medium for sensing said data signals a predetermined period of time after said data signals are sensed by said presensing head; second storage means comprising a rotatable recording medium having a fixed starting place thereon; a recording head positioned in operative proximity with said rotatable recording medium; rotating means for rotating said rotatable recording medium; coupling means coupling said presensing head to said rotating means so that said presensing head controls the operation of said rotating means to initiate rotation of said rotatable recording medium; transfer means connected between said sensing head and said recording head for transferring said data signals from said rotating recording medium to said rotatable recording medium, said transfer means comprising a first gate having an input connected to said sensing head, an output connected to said recording head and conduction control means, said first gate being adapted to maintain under the control of its conduction control means one of an open condition in which it conducts said data signals between its input and output and a closed condition in which it blocks said data signals; and transfer control means connected between said presensing head and the conduction control means of said first gate for controlling the transfer of data signals through said transfer means, said transfer control means comprising a first monostable multivibrator having a first output connected to the conduction control means of said first gate, a second output and an input, a second gate having an input connected to said presensing head, an output connected to the input of said first monostable multivibrator and conduction control means, said second gate being adapted to maintain under the control of its conduction control means one of an open condition in which it conducts said data signals between its input and output and a closed condition in which it blocks said data signals, and multivibrator circuit means connected between said presensing head and the conduction control means of said second gate for controlling in accordance with a predetermined time sequence the condition of said second gate and thereby controlling the condition of said first gate through said monostable multivibrator, and said coupling means including said second gate and a coupling connection between the output of said second gate and said rotating means so that said multivibrator circuit means also controls the operation of said rotating means through said second gate, said multivibrator circuit comprising a bistable multivibrator having a first input connected to the second output of said first monostable multivibrator, a second input and an output connected to the conduction control means of said second gate, and a second monostable multivibrator having an input connected to said presensing head and an output connected to the second input of said bistable multivibrator.

17. Apparatus for magnetically recording signals in predetermined locations comprising a continuously rotatable storage member having a magnetizable track; a recording head positioned to write on said track; a motor coupled by a clutch to said storage member; a locking mechanism for preventing rotation of said storage member; a first source of electrical signals; a second source providing said electrical signals after a predetermined interval of time; a first gate having its output coupled to said recording head and its input connected to said second source; a second gate having its input excited by signals from said first source; a trigger generator responsive to a signal from said first source for providing a delayed trigger; a bistable device holding said second gate closed when said device is in a first stable state, said bistable device being set into its second stable state by said delayed trigger; means responsive to a signal transmitted through said second gate for releasing said locking mechanism to permit said storage member to rotate; and a monostable device holding said first gate closed when said device is in its stable condition, said monostable device being triggered to its unstable condition by the output of said second gate whereby said first gate is opened, and said monostable device upon returning to its initial condition causing said bistable device to be reset.

18. A data storage arrangement comprising, in combination, first continuously moving storage means having data signals recorded thereon, said data signals forming a data unit commencing with a first data signal and ending with a last data signal; second storage means comprising a rotatable recording medium; rotating means for rotating said rotatable recording medium; transfer means connected between said first and second storage means for transferring said data signals from said first storage means to said second storage means; presensing means in operative proximity with said first storage means for sensing said data signals and for conditioning said rotating means for initiating rotation of said rotatable recording medium; and sensing means spaced behind said presensing means in operative proximity with said first storage means for sensing said data signals for energizing said rotating means to initiate rotation of said rotatable recording medium and for supplying said data signals from said first storage means to said second storage means through said transfer means a predetermined period of time after said rotating means is energized.

19. A data storage arrangement comprising, in combination, first storage means comprising a continuously moving recording medium, said moving recording medium having data signals recorded thereon, said data signals forming a data unit commencing with a first data signal and ending with a last data signal; second storage means comprising a rotatable recording medium; rotating means for rotating said rotatable recording medium; transfer means connected between said first and second storage means for transferring said data signals from said first storage means to said second storage means; presenting means in operative proximity with said first storage means for sensing said data signals and for conditioning said rotating means for initiating rotation of said rotatable recording medium; and sensing means spaced behind said presensing means in operative proximity with said first storage means for sensing said data signals for energizing said rotating means to initiate rotation of said rotatable recording medium and for supplying said data signals from said first storage means to said second storage means through said transfer means a predetermined period of time after said rotating means is energized, said predetermined period of time being of a duration sufficient to enable the speed of rotation of said second storage means to reach the speed of rotation of said first storage means.

20. A data storage arrangement comprising, in combination, first storage means comprising a continuously moving recording medium, said moving recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said first storage means to said second storage means; presensing means in operative proximity with said first storage means for sensing said data signals and for conditioning said rotating means for initiating rotation of said rotatable recording medium; and sensing means spaced between said presensing means in operative proximity with said first storage means for sensing said data signals for energizing said rotating means to initiate rotation of said rotatable recording medium and for supplying said data signals from said first storage means to said second storage means through said transfer means a predetermined period of time after said rotating means is energized, said predetermined period of time being of a duration selected so that said first data signal transferred through said transfer means reaches said rotatable recording medium at the fixed starting place thereon.

21. A data storage arrangement comprising, in combination, first storage means comprising a continuously moving recording medium, said moving recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said first storage means to said second storage means; presensing means in operative proximity with said first storage means for sensing said data signals and for conditioning said rotating means for initiating rotation of said rotatable recording medium; and sensing means spaced behind said presensing means in operative proximity with said first storage means for sensing said data signals for energizing said rotating means to initiate rotation of said rotatable recording medium and for supplying said data signals from said first storage means to said second storage means through said transfer means a predetermined period of time after aid rotating means is energized, said predetermined period of time being of a duration selected so that said first data signal transferred through said transfer means reaches said rotatable recording medium at the fixed starting place thereon and sufficient to enable the speed of rotation of said second storage means to reach the speed of movement of said first storage means.

22. A data storage arrangement comprising, in combination, first storage means comprising a continuously moving recording medium, said moving recording medium having data signals recorded thereon, said data signals forming a data unit commencing with a first data signal and ending with a last data signal; second storage means comprising a rotatable recording medium having a fixed starting place thereon; rotating means for rotating said rotatable recording medium; transfer means connected between said first and second storage means for transferring said data signals from said moving recording medium to said rotatable recording medium; a presensing head positioned in operative proximity with said moving recording medium for sensing said data signals and for conditioning said rotating means for initiating rotation of said rotatable recording medium, said presensing head being coupled to said rotating means; a sensing head spaced behind said presensing head positioned in operative proximity with said moving recording medium for sensing said data signals for energizing said rotating means to initiate rotation of said rotatable recording medium and for supplying said data signals from said first storage means to said second storage means through said transfer means a predetermined period of time after said rotating means is energized, said sensing head being coupled to said transfer means and to said rotating means; and a recording head positioned in operative proximity with said rotatable recording medium, said recording head being coupled to said transfer means.

23. A data storage arrangement comprising, in combination, first storage means comprising a continuously moving recording medium, said moving recording medium having data signals recorded thereon, said data signals forming a data unit commencing with a first data signal and ending with a last data signal; a presensing head positioned in operative proximity with said moving recording medium for sensing said data signals; a sensing head spaced behind said presensing head positioned in operative proximity with said moving recording medium for sensing said data signals; second storage means comprising a rotatable recording medium having a fixed starting place thereon; a recording head positioned in operative proximity with said rotatable recording medium; rotating means for rotating said rotatable recording medium; first coupling means coupling said presensing head to said rotating means so that said presensing head conditions said rotating means for operational control thereof; second coupling means coupling said sensing head to said rotating means so that said sensing head controls the operation of said rotating means to initiate rotation of said rotatable recording medium; and transfer means connected between said sensing head and said recording head for transferring said data signals from said moving recording medium to said rotatable recording medium a predetermined period of time after rotation of said rotatable recording medium is initiated.

24. A data storage arrangement comprising, in combination, first storage means comprising a continuously moving recording medium, said moving recording medium forming a data unit commencing with a first data signal and ending with a last data signal; a presensing head positioned in operative proximity with said moving recording medium for sensing said data signals; a sensing head spaced behind said presensing head positioned in operative proximity with said moving recording medium for sensing said data signals; second storage means comprising a rotatable recording medium having a fixed starting place thereon; a recording head positioned in operative proximity with said rotatable recording medium; rotating means for rotating said rotatable recording medium; a bistable multivibrator having a first input coupled to said presensing head, a second input coupled to said sensing head and an output coupled to said rotating means; and transfer means connected between said sensing head and said recording head for transferring said data signals from said moving recording medium to said rotatable recording medium a predetermined period of time after rotation of said rotatable recording medium is initiated, said transfer means comprising time delay means connected between said sensing head and said recording head.

References Cited by the Examiner

UNITED STATES PATENTS

| | | | |
|---|---|---|---|
| 2,561,869 | 7/51 | Kent | 346—44 X |
| 2,700,067 | 1/55 | Lockemann et al. | 340—174.1 X |
| 3,013,254 | 12/61 | Walker | 346—74 X |

IRVING L. SRAGOW, *Primary Examiner.*

BERNARD KONICK, *Examiner.*